United States Patent
Murahashi et al.

(10) Patent No.: US 12,069,215 B2
(45) Date of Patent: Aug. 20, 2024

(54) IMAGE READING APPARATUS AND IMAGE READING METHOD

(71) Applicant: SEIKO EPSON CORPORATION, Tokyo (JP)

(72) Inventors: Kenichi Murahashi, Kitakyushu (JP); Akifumi Sugano, Kitakyushu (JP); Yuko Hirayama, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/145,957

(22) Filed: Dec. 23, 2022

(65) Prior Publication Data

US 2023/0208991 A1    Jun. 29, 2023

(30) Foreign Application Priority Data

Dec. 28, 2021 (JP) ................. 2021-214474

(51) Int. Cl.
*H04N 1/193* (2006.01)
*H04N 1/00* (2006.01)
*H04N 1/12* (2006.01)

(52) U.S. Cl.
CPC ..... *H04N 1/00734* (2013.01); *H04N 1/00724* (2013.01); *H04N 1/00771* (2013.01); *H04N 1/123* (2013.01)

(58) Field of Classification Search
CPC .......... H04N 1/00734; H04N 1/00724; H04N 1/00771; H04N 1/123
See application file for complete search history.

(56) References Cited

U.S. PATENT DOCUMENTS

2017/0126911 A1* 5/2017 Kogi .................. H04N 1/0035

FOREIGN PATENT DOCUMENTS

JP          2001-077985 A      3/2001

* cited by examiner

*Primary Examiner* — Moustapha Diaby
(74) *Attorney, Agent, or Firm* — WORKMAN NYDEGGER

(57) ABSTRACT

A carrier sheet detecting unit is located upstream a reading unit in a transport direction in which transport is performed, and can detect a carrier sheet transported. Then, a control unit can determine that the carrier sheet is transported based on a detection result of the carrier sheet detecting unit. Additionally, the reading unit can read an original document sandwiched by the carrier sheet transported, the control unit can determine that the carrier sheet is transported based on a reading result of the reading unit. Then, the control unit switches between adopting the detection result of the carrier sheet detecting unit and adopting the reading result of the reading unit, and determines that the carrier sheet is transported.

8 Claims, 8 Drawing Sheets

IMAGE READING APPARATUS AND IMAGE READING METHOD

The present application is based on, and claims priority from JP Application Serial Number 2021-214474, filed Dec. 28, 2021, the disclosure of which is hereby incorporated by reference herein in its entirety.

BACKGROUND

1. Technical Field

The present disclosure relates to an image reading apparatus in which a carrier sheet is used and to an image reading method.

2. Related Art

In the past, an image reading apparatus has been used in which a document holder is utilized to read an original document.

JP 2001-77985 A discloses an image reading apparatus having a document holder including an identification hole, and an identification unit for identifying the identification hole.

To make it possible to determine whether there is an original document for which the document holder is used or not, the identification hole is formed at a tip site of the document holder. In the image reading apparatus, a light-emitting element and a photoreceptor element are disposed so as to face each other and to sandwich a passage site of the document holder. A circumference of the identification hole is made not transmissive, and when the original document passes, whether the document holder is used or not is determined based on transmission timing and light shielding timing when the document holder passes between the light-emitting element and the photoreceptor element. Note that, the document holder is also referred to as a carrier sheet.

In the apparatus of JP 2001-77985 A described above, the identification hole of the document holder is detected by the light-emitting element and the photoreceptor receiving element, and if any of the light-emitting element and the photoreceptor element fails, it is not able to determine whether the document holder is used or not at all.

SUMMARY

The present disclosure is an image reading apparatus configured to read an image on an original document that is sandwiched by a carrier sheet including a joint where peripheral portions of two sheets for sandwiching the original document are joined, that includes a transport unit configured to transport the carrier sheet, a reading unit configured to read the image on the original document sandwiched by the carrier sheet transported, a carrier sheet detecting unit located upstream the reading unit in a transport direction in which transport is performed, and configured to detect the carrier sheet transported, and a control unit configured to determine that the carrier sheet is transported according to a detection result of the carrier sheet detecting unit, wherein the control unit is configured to determine that the carrier sheet is transported based on the detection result of the carrier sheet detecting unit or a reading result of the reading unit, and is configured to switch between adopting the detection result of the carrier sheet detecting unit and adopting the reading result of the reading unit.

In the configuration described above, the carrier sheet detecting unit is located upstream of the reading unit in the transport direction in which transport is performed, and detects the carrier sheet transported. Then, the control unit determines that the carrier sheet is transported based on the detection result of the carrier sheet detecting unit. Additionally, when the reading unit reads the image on the original document sandwiched by the carrier sheet transported, the control unit determines whether the carrier sheet is transported or not based on the reading result of the reading unit. Then, the control unit switches between adopting the detection result of the carrier sheet detecting unit and adopting the reading result of the reading unit, and determines that the carrier sheet is transported.

As a result, it is possible to determine that the carrier sheet is transported, even when the carrier sheet detecting unit becomes not normal.

DESCRIPTION OF EXEMPLARY EMBODIMENTS

Exemplary embodiments of the present disclosure will be described below based on the accompanying figures.

Figure 1:
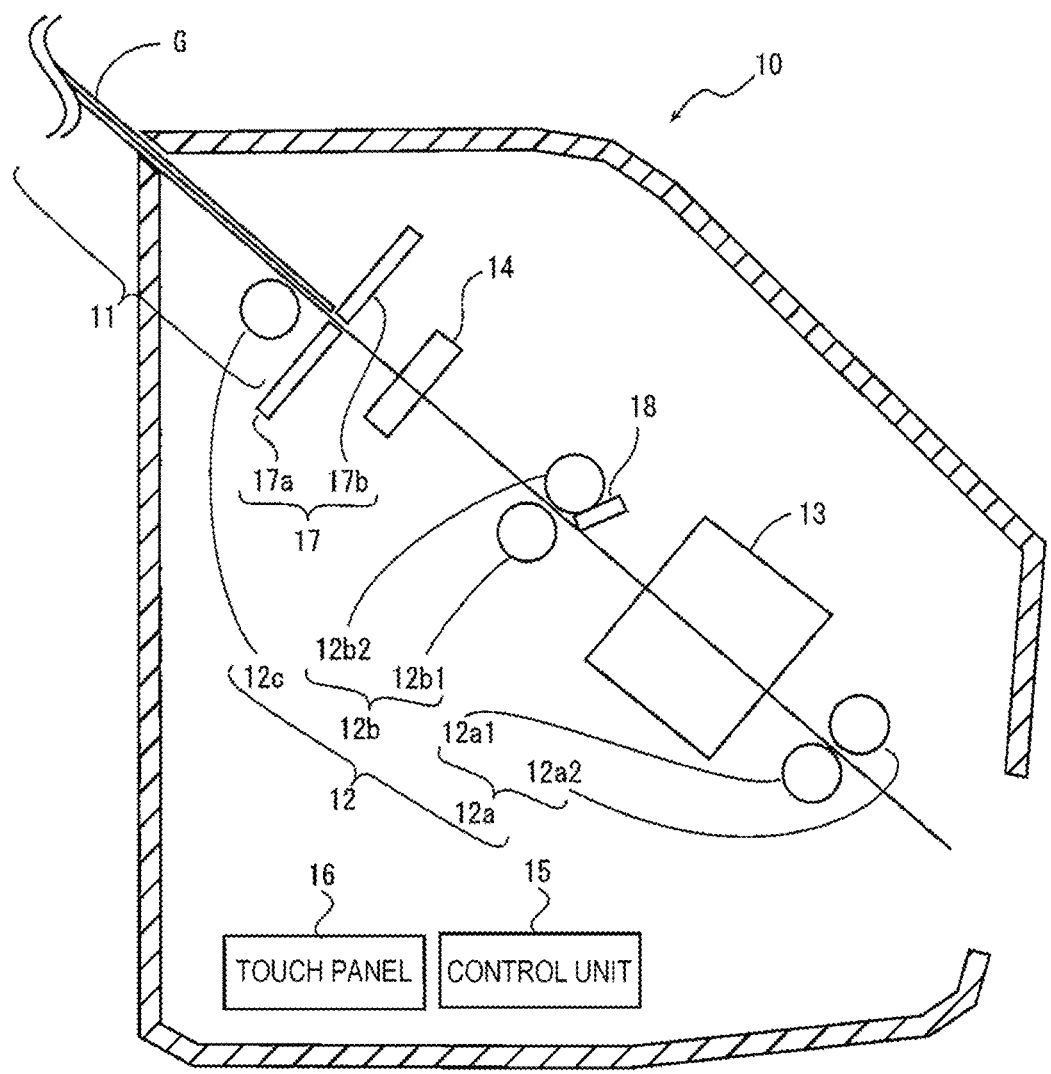
FIG. 1 is diagram illustrating a schematic configuration of an image reading apparatus.

FIG. 1 illustrates an image reading apparatus according to an exemplary embodiment of the present disclosure with a schematic configuration diagram. An image reading apparatus 10 includes a placement portion 11 for placing an original document G, a transport unit 12 for transporting the original document G placed on the placement portion 11 along a predetermined transport path, a reading unit 13 for reading an image on the original document G transported, a multi-feeding detecting unit 14 for detecting multi-feeding of the original document G in the transport path, a control unit 15 for detecting whether multi-feeding occurs or not based on a detection result of the multi-feeding unit 14, a touch panel 16 for displaying and receiving an input of an user, and a carrier sheet detecting unit 17. Note that, when processes in which the control unit 15 performs processing in a time-series manner are regarded as respective steps, a time-series linkage of these steps can be grasped as a single method disclosure.

The transport unit 12 includes a paper feed roller pair 12b, which has rollers 12b1, 12b2, and a paper ejecting roller pair 12a, which has rollers 12a1, 12a2. The rollers 12b1, 12b2 of the paper feed roller pair 12b and the rollers 12a1, 12a2 of the paper ejecting roller pair 12a are disposed so as to sandwich the transport path. Hereafter, the paper feeding roller pair 12b is referred to as PF roller pair 12b and the paper ejecting roller is referred to as EL roller pair 12a. The roller 12b1 of the PF roller pair 12b and the roller 12a1 of the EJ roller 12a are disposed below the transport path, linked to a drive mechanism, and driven to rotate. The PF roller pair 12b is disposed upstream of the reading unit 13 in a transport direction in which the original document G is transport and transports the original document G. The EJ roller pair 12a is disposed downstream of the reading unit 13, and transports and ejects the original document G read by the reading unit 13. Note that, a PE sensor 18 that detects a trailing end of the original document is provided at a position of the PE roller pair 12b.

A load roller 12c is provided at a site closer to the placement portion 11 upstream of the PF roller pair 12b, and the load roller 12c transports only one sheet of the original document G from the placement portion 11 to the transport path. The carrier sheet detecting unit 17 is provided between the load roller 12c and the PF roller pair 12b in the transport direction. In the carrier sheet detecting unit 17, a light-emitting unit 17a is disposed below the transport path, and a light-receiving unit 17b is disposed above the transport path.

The multi-feeding detecting unit 14 detects whether multi-feeding occurs or not based on a degree of attenuation when ultrasonic waves pass through the original document. Note that, a detection result of the multi-feeding detecting unit 14 has a large degree of fluctuation based on the degree of attenuation of the ultrasonic waves, and thus, whether multi-feeding occurs or not is comprehensively determined in consideration of other factors. When multi-feeding is determined to be occurred, predetermined processing such as error notification or stopping transportation is performed. In addition, a carrier sheet CS is a sheet for which the multi-feeding detecting unit 14 is likely to mistakenly determine that multi-feeding occurs since a degree of attenuation of ultrasonic waves, which transmits through the carrier sheet CS, is large.

In this way, the multi-feeding detecting unit 14 for detecting multi-feeding of the original document transported by the transport unit 12 is provided, and the control unit 15 determines multi-feeding of the original document G based on a detection result of the multi-feeding detecting unit 14. Then, when it is determined that multi-feeding of the original document G occurs, an error is reported.

The light-emitting unit 17a can change a light amount, and a detection signal changes according to the light amount received in the light-receiving unit 17b. In this manner, the light-receiving unit 17b outputs a detection signal corresponding to transmittancy.

Figure 2:
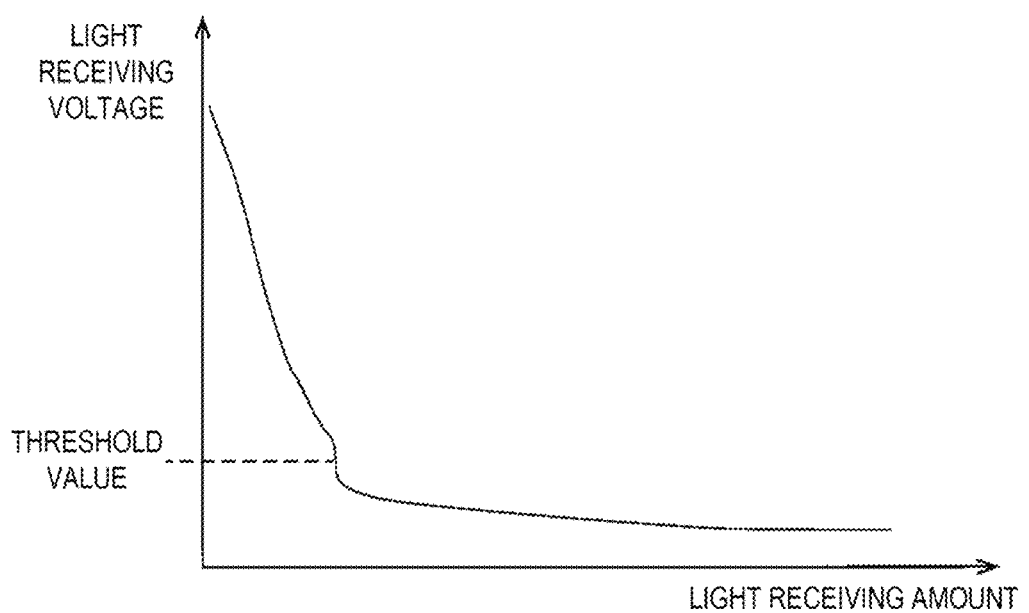
FIG. 2 is a diagram illustrating a relationship between light receiving amount in a light-receiving unit and light receiving voltage, which is a detection signal.

FIG. 2 is a diagram illustrating a relationship between light receiving amount in the light-receiving unit and light receiving voltage, which is a detection signal. In general, when a light receiving amount is large, a light receiving voltage decreases, and when the light receiving amount is low, the light receiving voltage increases.

Figure 3:
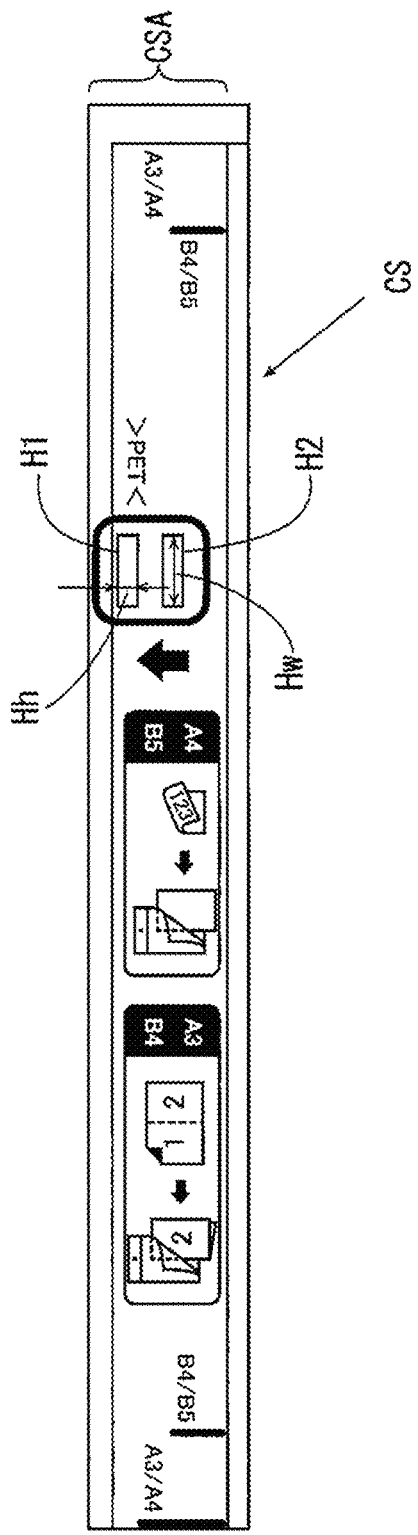
FIG. 3 is a top view of a tip site of a carrier sheet.

FIG. 3 is a top view of a tip part of the carrier sheet CS.

In the carrier sheet CS, parts of peripheral portions of respective two transparent sheets for sandwiching the original document are joined to each other. The carrier sheet CS includes a joint CSA that is the joint part. When the carrier sheet CS is set to the placement portion 11, the joint CSA is disposed facing downstream. Thus, the joint CSA passes through the carrier sheet detecting unit 17 first.

Graphics for telling how to use to a user are printed on the joint CSA, and two identification holes H1 and H2 are formed therein. The joint CSA is non-transmissive except for the identification holes H1 and H2, and the identification holes H1 and H2 are transmissive. The identification holes H1 and H2 may be made of transparent materials, or may be through-holes. A width of each of the identification holes H1 and H2 is a window width Hw, and a height is a window height Hh.

In this way, the carrier sheet CS includes the identification holes H1 and H2 that are transmissive opening portions, and a light-shielding portion having light-shielding properties except for the two identification holes H1 and H2 in the joint CSA, and the control unit 15 determines that the carrier sheet CS is transported, as described later, based on a detection result by the carrier sheet detecting unit 17 detecting the opening portions and the light shielding portion, or a reading result by the reading unit 13 reading the opening portions and the light-shielding portion.

Note that, in the present working example, although the carrier sheet CS is determined based on the opening portion, but a specific mark, pattern, or the like may be used, instead of the opening portion.

Also, as an identification method when detecting the carrier sheet CS, the carrier sheet detecting unit 17 and the reading unit 13 share the identification holes H1 and H2, thus the configuration of the carrier sheet CS can be simplified.

Figure 4:
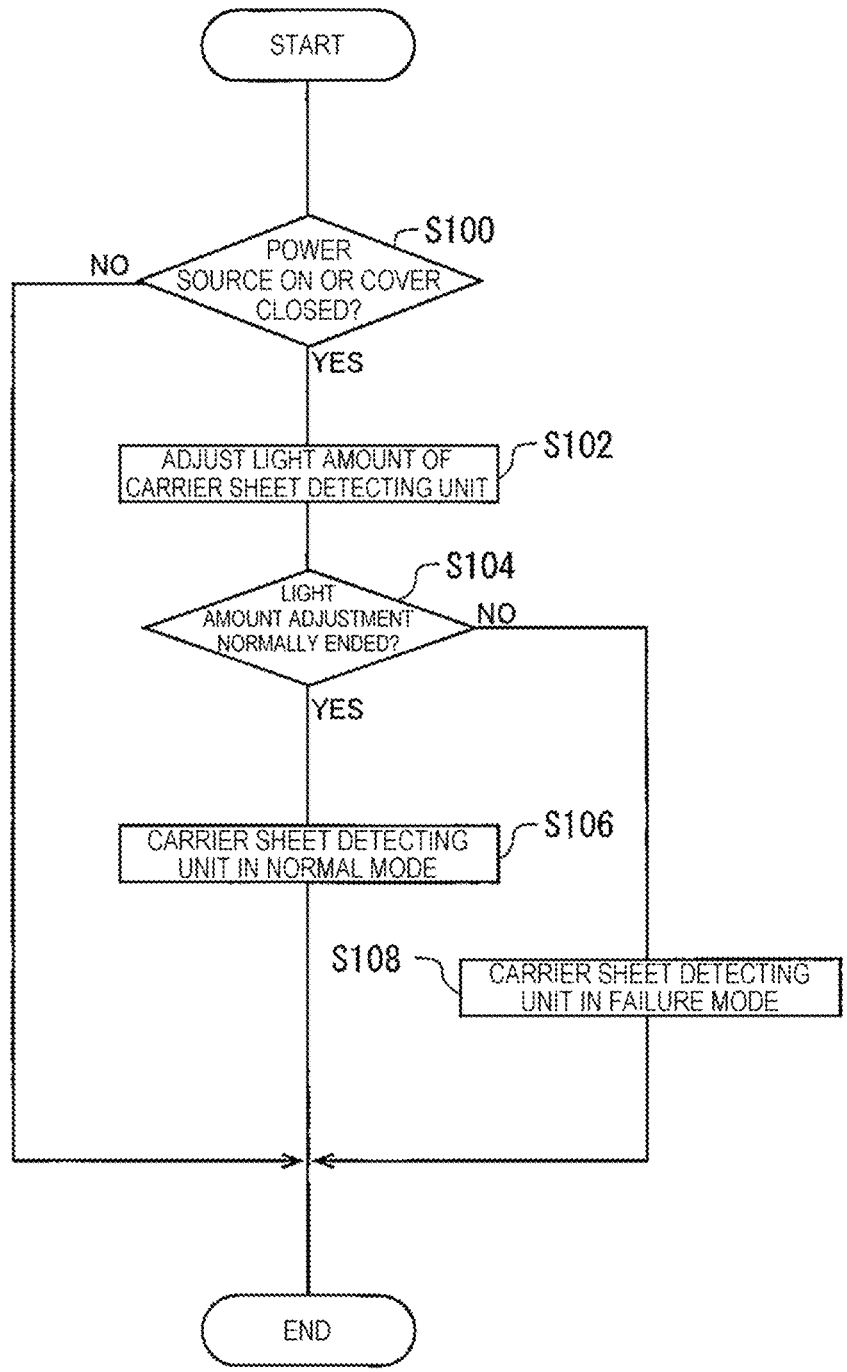
FIG. 4 is a flowchart for determining a failure of a carrier sheet detecting unit.

FIG. 4 is a flowchart for determining a failure of the carrier sheet detecting unit.

The control unit 15 performs the following processing with timing at which power supply is on, or timing at which a cover, which is not illustrated, for closing the transport path is closed, as a trigger, in step S100. In step S102, the control unit 15 performs light amount adjustment to adjust the light amount of the carrier sheet detecting unit 17. As illustrated in FIG. 2, when a light receiving amount is changed, a light receiving voltage changes. Therefore, the light receiving voltage is monitored such that a desired light receiving amount is reached. When the carrier sheet detecting unit 17 is normal, the light amount adjustment successfully ends when a predetermined light receiving voltage is reached. However, it can be determined that the carrier sheet detecting unit 17 is not normal when the light receiving amount is changed but the light receiving voltage does not change, and it can be determined that the carrier sheet detecting unit 17 is not normal even when the light receiving voltage changes but a magnitude relationship does not change as compared to a predetermined threshold value.

In this way, the carrier sheet detecting unit 17 includes an optical sensor, which has the light-emitting unit 17a and the light-receiving unit 17b, in which a detection signal increases or decreases in accordance with the light amount, and the control unit 15 increases or decreases the light amount, and compares an output signal from the carrier sheet detecting unit 17 with the threshold value, and determines whether the carrier sheet detecting unit 17 is normal or not, based on a comparison result. That is, according to the output signal from the carrier sheet detecting unit 17, whether the carrier sheet detecting unit 17 is normal or abnormal can be automatically determined.

Whether the light amount adjustment successfully ends or not is determined in step S104, and in a case of a normal end, the carrier sheet detecting unit 17 is normal, and a normal mode is set in step S106, and in a case of not a normal end, the carrier sheet detecting unit 17 is not normal, and a failure mode is set in step S108.

Figure 5:
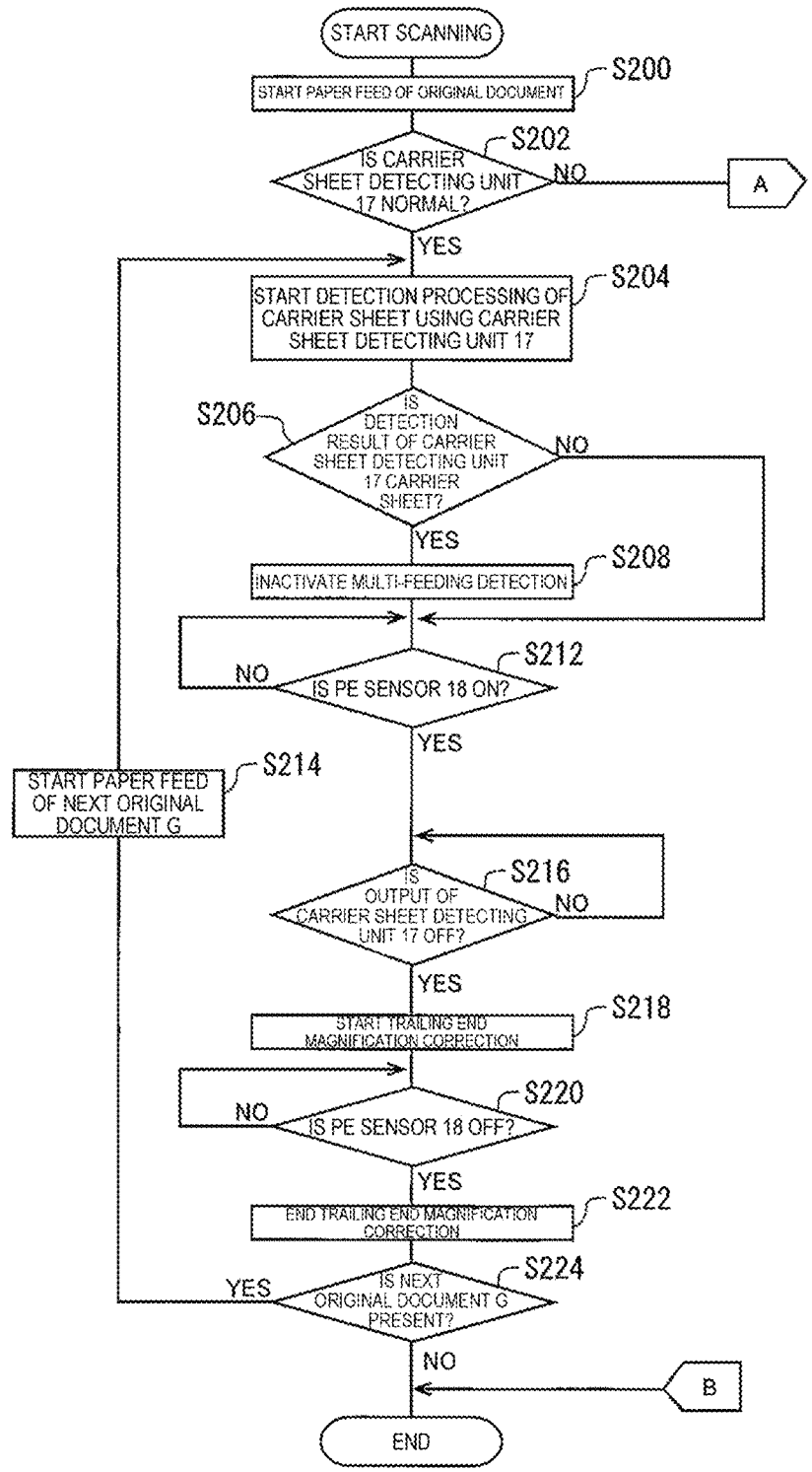
FIG. 5 is a flowchart of image reading processing.
Figure 6:
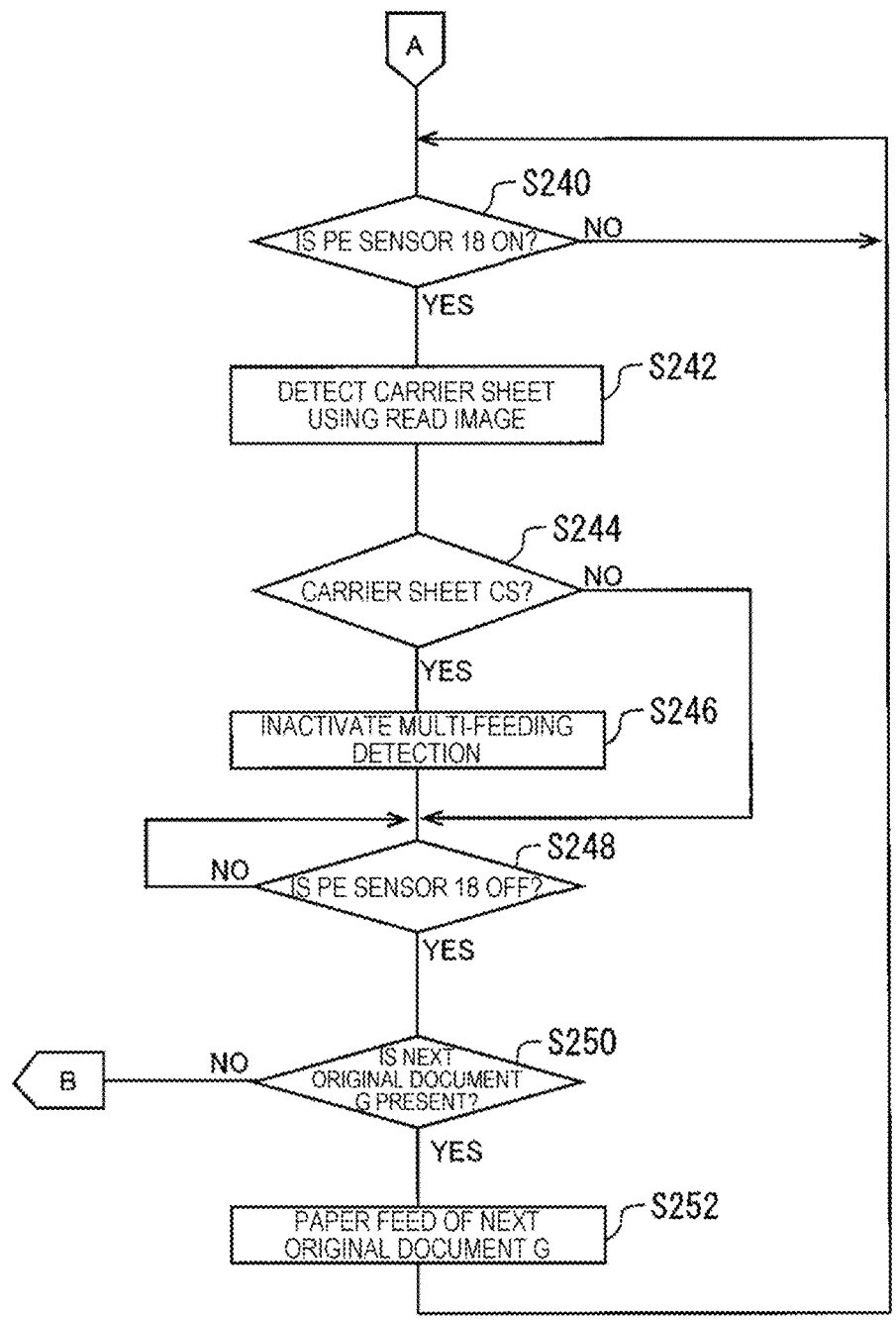
FIG. 6 is the flowchart of the image reading processing.

FIG. 5 and FIG. 6 illustrate a flowchart of image reading processing.

The control unit 15 starts to supply an original document in step S200, and in step S202, based on the processing illustrated in FIG. 4, and based on determination of whether the carrier sheet detecting unit 17 is normal or not, performs a normal mode in step S204 and later in a case of normal, or performs a failure mode in step S240 and later in a case of not normal. In the normal mode in step S204 and later, it is determined that the carrier sheet CS is transported based on a detection result of the carrier sheet detecting unit 17, which is an example for a first step, and in the failure mode in step S240 and later, it is determined that the carrier sheet CS is transported based on a reading result of the reading unit 13, which is an example for a second step.

In this way, in the present working example, the control unit 15 can determine that the carrier sheet CS is transported based on the detection result of the carrier sheet detecting unit 17 or the reading result of the reading unit 13, and can switch between adopting the detection result of the carrier sheet detecting unit 17 adopting the reading result of the reading unit 13, which is corresponding to step S202.

In this branch processing, the control unit 15, when the carrier sheet detecting unit 17 is normal, determines that the carrier sheet CS is transported based on the detection result of the carrier sheet detecting unit 17, and when the carrier sheet detecting unit 17 is not normal, determines that the carrier sheet CS is transported based on the reading result of the reading unit 13.

In this way, when the carrier sheet detecting unit 17 is abnormal, it is possible to automatically switch between adopting the detection result of the carrier sheet detecting unit 17 and adopting the reading result of the reading unit 13. Now, detailed description is given.

When performing the normal mode, in step S204, the control unit 15 uses the carrier sheet detecting unit 17 and causes detection processing of the carrier sheet CS to start. The carrier sheet detecting unit 17 determines whether the original document is the carrier sheet CS or not based on presence of the identification holes H1 and H2, thus when the detection of the carrier sheet detecting unit 17 results in the carrier sheet CS in step S206, the control unit 15 inactivates multi-feeding detection in step S208, and proceeds to step S212. Because the multi-feeding detecting unit 14 determines multi-feeding in the case that the carrier sheet CS is transported, even when multi-feeding does not occur. On the other hand, in step S206, as long as the detection of the carrier sheet detecting unit 17 does not result in the carrier sheet CS, the control unit 15 proceeds to step S212 without inactivating the multi-feeding detection.

In this way, when it is detected that the carrier sheet CS is transported, determination of multi-feeding is not performed. The carrier sheet CS is likely to be mis-detected as multi-feeding. It is possible to prevent false detection since determination of multi-feeding is not performed.

Note that, after the carrier sheet CS is fed, the reading unit 13 functions independently, and processes read pixel data in conjunction with a feed speed of the carrier sheet CS.

In step S212, based on a detection result of the PE sensor 18, the control unit 15 waits for a tip of the carrier sheet CS or the original document G to pass through the PE sensor 18, and the PE sensor 18 is on when the tip of the carrier sheet CS or the original document G passes through the PE sensor 18.

After this, in step S216, the control unit 15 waits until output of the carrier sheet detecting unit 17 is off, and when the output is off, starts trailing end magnification correction in step S218. The trailing end magnification correction is processing, when the carrier sheet CS is read, for correcting an image at a trailing end due to a thickness thereof, and in step S220, the processing continues until it is determined that the PE sensor 18 is off and the trailing end of the carrier sheet CS passes through. When it is determined that the trailing end of the carrier sheet CS passes through in step S220, the control unit ends the trailing end magnification correction in step S222, and in step S224, determines whether the next carrier sheet or the next original document G is present or not, and when the next carrier sheet CS or the next original document G is present, causes supply of the next carrier sheet CS or the next original document G to start in step S214, and repeats step S204 and later, and when there is no next carrier sheet CS or next original document G, ends the image reading processing.

In the present working example, supply of the next original document G is caused to start based on the detection result of the PE sensor 18, but when the carrier sheet detecting unit 17 is normal, the transport unit can be caused to feed the next original document based on the detection result of the carrier sheet detecting unit 17. In this case, since the carrier sheet detecting unit 17 is disposed upstream of the PE sensor 18, it is possible to cause feeding of the next original document G to start earlier.

In this way, when the carrier sheet detecting unit 17 is normal, the control unit 15 may cause the transport unit to feed the next original document, based on the detection result of the carrier sheet detecting unit 17.

On the other hand, when it is determined that the failure mode is performed in step S202, the processing proceeds to step S240, the PE sensor 18 is on, and waits for the tip of the original document G to be detected. When the PE sensor 18 detects the tip of the original document G, the control unit 15 detects the carrier sheet CS using a read image in step S242.

Figure 7:
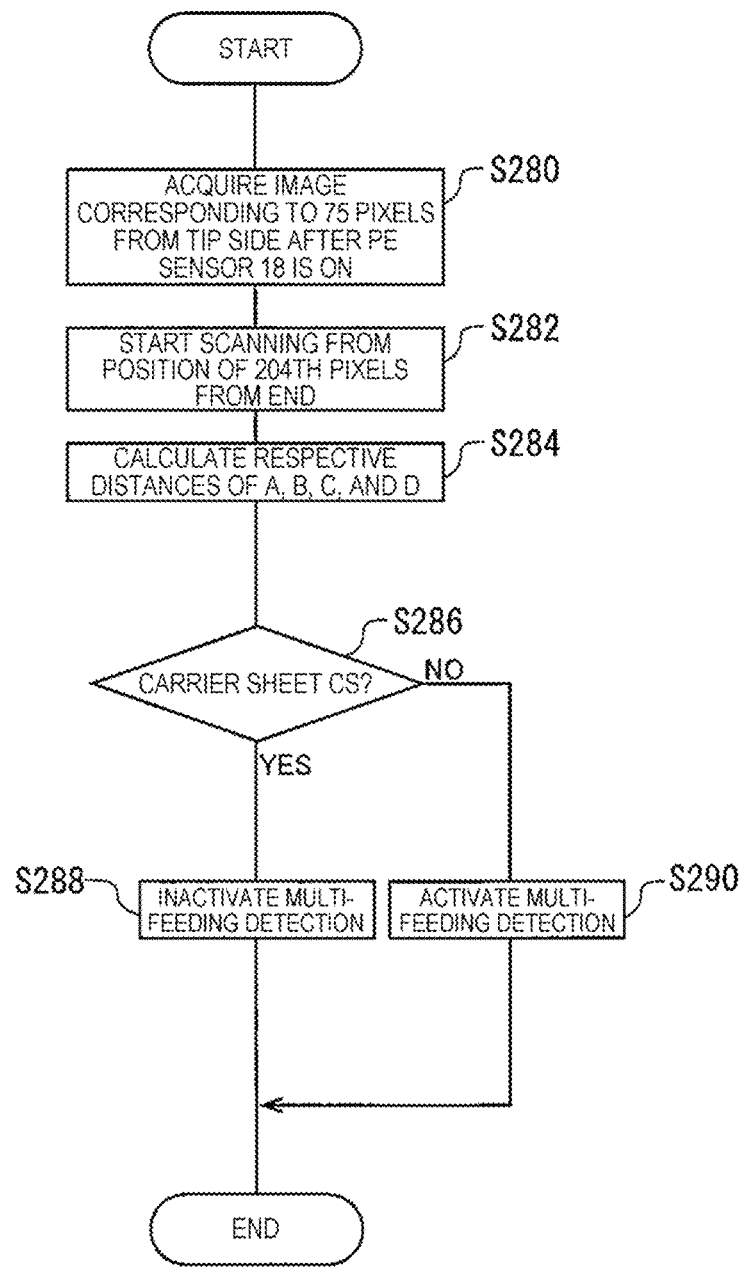
FIG. 7 is a flowchart of processing for detecting a carrier sheet using a read image.
Figure 8:
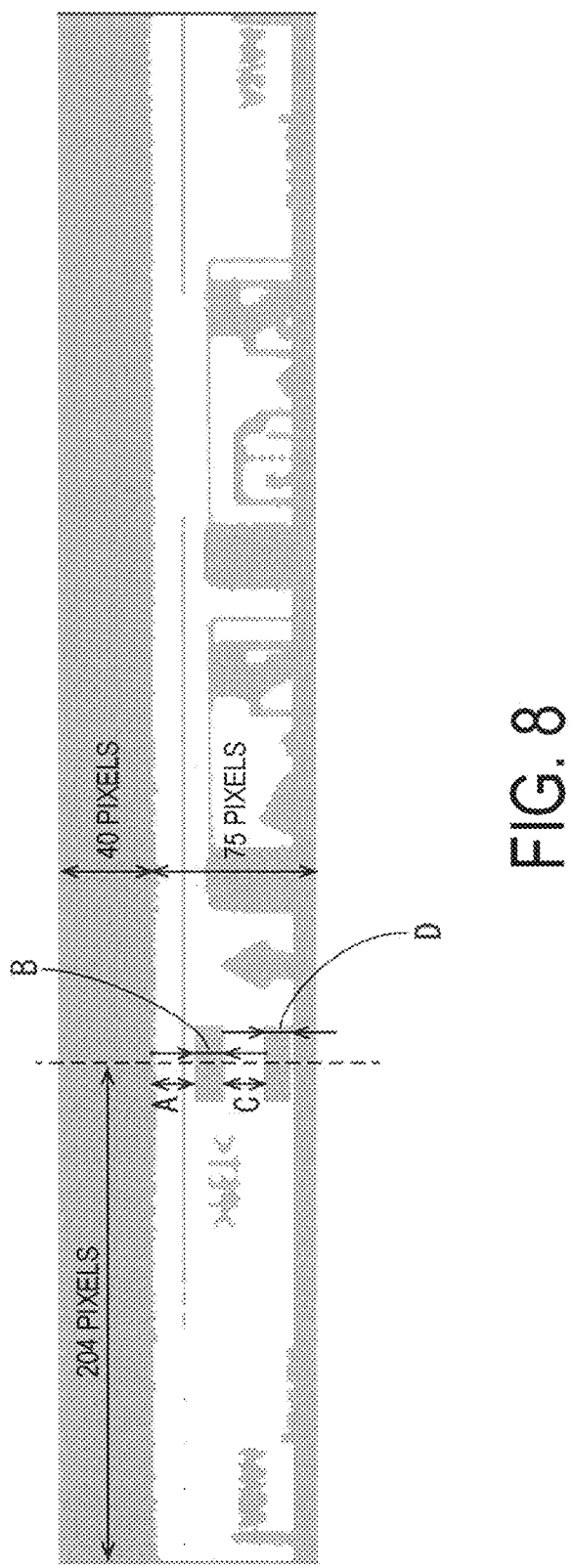
FIG. 8 is a reading image of the tip site of the carrier sheet.

FIG. 7 is a flowchart of processing for detecting the carrier sheet using a read image, FIG. 8 is a reading image of a tip site of the carrier sheet.

In step S280, the control unit 15 acquires an image corresponding to 75 pixels from a tip side in the transport direction, after the PE sensor 18 is on. Subsequently, in step S282, a scan is started vertically from a position of a 204th pixel from an end.

The image in FIG. 8 is a binary image obtained by viewing the carrier sheet CS from a lower side, and when referring to the image, a center in a width direction of the identification holes H1 and H2 is read at a position of the 204th pixel from left. The image illustrated in FIG. 8 also includes 40 pixels corresponding to an overscan, and the image corresponding to the 75 pixels from the tip side is an image from a 41st pixel illustrated in the same figure. In the binary image, the identification holes H1 and H2 are expressed by black pixels, and a periphery of the identification holes H1 and H2 is expressed by white pixels. Accordingly, the number of pixels of each of sites A, B, C, and D illustrated in the figure is determined based on whether the white pixels or black pixels.

The control unit 15 can calculate respective distances of A, B, C, and D based on the respective numbers of pixels of A, B, C, and D illustrated in the figure, in step S284, and thus it is possible to compare with actual distances of the identification holes H1 and H2 of the carrier sheet CS. The control unit 15 determines, in step S286, based on a result of the comparison, whether the carrier sheet CS is present or not, and when the carrier sheet CS is present, inactivates the multi-feeding detection in step S288, and when the carrier sheet CS is not present, activates the multi-feeding detection in step S290.

Note that, the multi-feeding detection is activated, and the control unit 15 determines whether the multi-feeding occurs or not based on a detection result. Furthermore, when the multi-feeding is determined to be performed, transport can be stopped immediately, or can be stopped after the original document G is discharged.

The carrier sheet detecting unit 17 including the light-emitting unit 17a and the light-receiving unit 17b is used in addition to the reading unit 13 in step S206, and based on the detection result the processing for inactivating the multi-feeding detection is performed in step S208, but it can be said that similar processing is achieved based only on the read image of the reading unit 13 here. Thus, normally, it is sufficient to inactivate the multi-feeding detection by using the carrier sheet detecting unit 17 without performing image processing, but if the carrier sheet detecting unit 17 fails, or the like, it does not mean that the carrier sheet detection becomes entirely unavailable, and in this case, the carrier sheet detection can be continued by performing the image processing as an auxiliary method. In other words, even when the carrier sheet detecting unit 17 cannot detect the carrier sheet CS due to deterioration or disturbance, switching can be performed such that the carrier sheet CS is determined by the reading result of the reading unit 13. Accordingly, ease of use for a user can be enhanced.

In the processing in step S204 and later, in a state in which the carrier sheet CS is determined to be transported based on the detection result of the carrier sheet detecting unit 17, a period until the original document G is transported and multi-feeding is determined is defined as a first period. In contrast, in the processing in step S240 and later, in a state in which the carrier sheet CS is determined to be transported based on the reading result of the reading unit 13, a period until multi-feeding of the original document is determined is defined as a second period.

In the state in which the carrier sheet CS is determined to be transported based on the detection result of the carrier sheet detecting unit 17, multi-feeding of the original document is determined based on a detection result of the multi-feeding detecting unit 14. In contrast, in the state in which the carrier sheet CS is determined to be transported based on the reading result of the reading unit 13, multi-feeding of the original document is determined after whether the carrier sheet CS is present or not is determined based on the reading result of the reading unit 13.

In the present exemplary embodiment, the carrier sheet detecting unit 17 is disposed upstream of the reading unit 13 in the transport path, and thus the first period is shorter than the second period. Accordingly, it is possible to detect multi-feeding of the original document earlier as long as the carrier sheet detecting unit 17 is available.

As described above, since the carrier sheet detecting unit 17 is located upstream the reading unit 13 in the transport direction, it is possible to report multi-feeding earlier when the determination is performed based on the detection result of the carrier sheet detecting unit 17 than when the determination is performed based on the reading result of the reading unit 13.

As a result, the original document for which multi-feeding is performed can be protected.

Note that, as illustrated in FIG. 8, the center in the width direction of each of the identification holes H1 and H2 in the read image is the position of the 204th pixel from left. If the carrier sheet CS is set to the placement portion 11 with the front and back reversed, the center in the width direction of each of the identification holes H1 and H2 is a position of a 204th pixel from right. The light-emitting unit 17a and the light-receiving unit 17b of the carrier sheet detecting unit 17 cannot detect the carrier sheet CS with front and back set not correctly, but with the image processing, the carrier sheet CS can be detected by vertically scanning the position of the 204th pixel from right, rather than vertically scanning the position of the 204th pixel from left in step S282. Therefore, in step S282, it is possible to improve convenience of detecting the carrier sheet CS, by using the position of the 204th pixel from the left or right end.

In this way, the identification holes H1 and H2, which are opening portions, are provided on one end side of the center in a direction intersecting the transport direction. Then, the control unit 15 can determine the front and back sides of the carrier sheet CS by detecting a position of the opening portion from the reading result by the reading unit 13 reading the identification holes H1 and H2 being the opening portions.

That is, by reading the position of the opening portion, it is possible to determine the front and back sides of the carrier sheet CS. As a result, even when the user mistakenly causes the carrier sheet CS to be transported with the back facing up, it can also be detected that the carrier sheet CS is present, the front and back sides of the carrier sheet CS can be determined, and usability can be ensured.

The detection method of the identification holes H1 and H2 is not limited to the determination based on the respective distances of A, B, C, and D illustrated in FIG. 8. For example, based on the respective distances of A, B, C, and D, an interval between upper side positions of the respective identification holes H1 and H2 is (B+C), and may be compared to an actual value. Also, an interval between lower side positions of the respective identification holes H1 and H2 is (C+D), and may be compared to an actual value. Also, since the hole is the window, the window width Hw may be measured. For the window width Hw, it is sufficient to search for a black pixel in the width direction at a position of a white pixel that can be inferred to be of the identification hole H1 or H2 in a vertical scanning direction, and compare a distance based on the number of pixels of white pixels when the black pixel is found, with an actually measured value. Furthermore, in a case where scanning is performed in the vertical direction at the positions of the 204th pixels from both the respective ends, even when the identification holes H1 and H2 are found in the scans at both the respective ends, although the identification holes H1 and H2 should be found only in the scan at one end originally, it can be determined that the carrier sheet CS is not present actually.

By attempting to detect the identification holes H1 and H2 in various ways as described above, it is possible to prevent objects that are not the identification holes H1 and H2 from being incidentally false-detected as the identification holes H1 and H2 due to patterns, graphics, or the like at a tip site of the original document G, rather than the carrier sheet CS.

As described above, in step S242, whether the carrier sheet CS is present or not is detected, and when the carrier sheet CS is present in step 244, the control unit 15 inactivates the multi-feeding detection in step S246. The reason why multi-feeding is not determined when the carrier sheet CS is determined to be transported is that, as described above, it is possible to prevent false detection since multi-feeding is not determined, when the carrier sheet CS for which false detection as multi-feeding is likely to occur is transported. Of course, when the carrier sheet CS is not transported, the multi-feeding detection is activated.

Even when the carrier sheet detecting unit 17 is not normal, the reading unit 13 functions independently after feeding of the original document G or the carrier sheet CS, regardless of whether the carrier sheet CS is present or not, and processes pixel data read in conjunction with a feed rate of the original document G of the carrier sheet CS.

After a while after the original document G or the carrier sheet CS is transported, the trailing end of the original document G or the carrier sheet CS also naturally comes close to the reading unit 13. Then, when a position of the PE sensor 18 is exceeded, the PE sensor 18 is off. In step S248, the control unit 15 waits for the PE sensor 18 to be off, and when the PE sensor is off, and it is determined that the next document G or the next carrier sheet CS is present in step S250, the next original document G or the next carrier sheet CS is supplied in step S252.

As described above, when the carrier sheet detecting unit 17 is not normal, the control unit 15 causes the transport unit to feed the next original document G or the next carrier sheet CS, based on the detection result of the PE sensor 18 that detects the trailing end.

The PE sensor 18 corresponds to a trailing end detection unit that detects the trailing end of the original document G or the next carrier sheet CS transported by the transport unit 12 and read by the reading unit 13. Furthermore, even when the carrier sheet detecting unit 17 is abnormal, discharging process and feeding process can be appropriately performed.

In the present working example, it is determined whether the carrier sheet CS is present or not based on the reading result of the reading unit 13 only when the carrier sheet detecting unit 17 fails and is not normal. However, the determination may be left to a selection by the user. In other words, the control unit 15 may cause an operation panel such as the touch panel 16 to cause the user to select whether to determine the presence of the carrier sheet CS or not based on the reading result of the reading unit 13. There are several merits for using the carrier sheet detecting unit 17, but there is also a merit that by using the reading result of the reading unit 13, reading can be performed correctly even when the front and back are wrong.

In this case, a reception unit is configured to receive a selection of the user, and the control unit 15 is configured to switch between adopting the detection result of the carrier sheet detecting unit 17 and adopting the reading result of the reading unit 13 according to the selection of the user input from the reception unit, and switch information for determining that the carrier sheet CS is transported to the detection result of the carrier sheet detecting unit 17 or the reading result of the reading unit 13.

For example, even when it cannot be automatically determined that the image reading apparatus is normal or abnormal, the user can optionally perform the switching. Thus, even when the carrier sheet detecting unit 17 fails, presence of the carrier sheet CS can be determined, and the carrier sheet CS can be read without decreasing usability.

The present disclosure can be grasped not only as a disclosure of a tangible thing, but also as a disclosure of a method in view of processing processes thereof, and the processes are also evident from the flowchart illustrated in FIG. 5 and FIG. 6.

Note that the present disclosure is not limited to the working example described above. As will be appreciated by those skilled in the art, the following is disclosed as working examples of the present disclosure:

appropriately changing and applying a combination of mutually exchangeable members, configurations, and the like, disclosed in the above working example although not disclosed in the above working example, appropriately replacing members, configurations, and the like that are publicly known techniques disclosed in the above working example with mutually replaceable members, configurations, and the like, and changing and applying a combination thereof although not disclosed in the above working example, appropriately replacing with members, configurations, and the like that a person skilled in the art can envision as a substitute for the members, configurations, and the like disclosed in the above working example based on publicly known techniques and the like, and changing and applying a combination thereof.

What is claimed is:

1. An image reading apparatus configured to read an image on an original document that is sandwiched by a carrier sheet including a joint where peripheral portions of two sheets for sandwiching the original document are joined, the image reading apparatus comprising:
a transport unit configured to transport the carrier sheet;
a reading unit configured to read the image on the original document sandwiched by the carrier sheet transported;
a carrier sheet detecting unit located upstream of the reading unit in a transport direction, and configured to detect the carrier sheet transported; and
a control unit configured to determine that the carrier sheet is transported based on a detection result of the carrier sheet detecting unit or a reading result of the reading unit, wherein
the control unit is configured to switch between adopting the detection result of the carrier sheet detecting unit and adopting the reading result of the reading unit,
the control unit determines whether the carrier sheet detecting unit is normal or not,
when the carrier sheet detecting unit is normal, the control unit determines that the carrier sheet is transported based on the detection result of the carrier sheet detecting unit, and
when the carrier sheet detecting unit is not normal, the control unit determines that the carrier sheet is transported based on the reading result of the reading unit.

2. The image reading apparatus according to claim 1, wherein
the carrier sheet detecting unit includes an optical sensor of which a detection signal increases or decreases in accordance with light amount, and
the control unit increases or decreases light amount, compares an output signal from the carrier sheet detecting unit with a threshold value, and determines whether the carrier sheet detecting unit is normal or not, based on a comparison result.

3. The image reading apparatus according to claim 1, comprising a reception unit configured to receive a selection of a user, wherein
the control unit is configured to
switch between adopting the detection result of the carrier sheet detecting unit and adopting the reading result of the reading unit according to the selection of the user input from the reception unit, and
switch between adopting the detection result of the carrier sheet detecting unit and adopting the reading result of the reading unit according to the selection of the user input.

4. The image reading apparatus according to claim 1, further comprising,
a trailing end detecting unit configured to detect a trailing end of an original document transported by the transport unit, wherein
the control unit,
causes the transport unit to feed a next original document, based on a detection result of the trailing end detecting unit, when the carrier sheet detecting unit is not normal, and causes the transport unit to feed a next original document, based on the detection result of the carrier sheet detecting unit, when the carrier sheet detecting unit is normal.

5. An image reading apparatus configured to read an image on an original document that is sandwiched by a carrier sheet including a joint where peripheral portions of two sheets for sandwiching the original document are joined, the image reading apparatus comprising:
   a transport unit configured to transport the carrier sheet;
   a reading unit configured to read the image on the original document sandwiched by the carrier sheet transported;
   a carrier sheet detecting unit located upstream of the reading unit in a transport direction, and configured to detect the carrier sheet transported; and
   a control unit configured to determine that the carrier sheet is transported based on a detection result of the carrier sheet detecting unit or a reading result of the reading unit, wherein
   the control unit is configured to switch between adopting the detection result of the carrier sheet detecting unit and adopting the reading result of the reading unit,
   the carrier sheet includes a transmissive opening portion and a light-shielding portion having light-shielding properties at the joint, and
   the control unit determines that the carrier sheet is transported, based on the detection result by the carrier sheet detecting unit detecting the opening portion and the light-shielding portion, or the reading result by the reading unit reading the opening portion and the light-shielding portion.

6. The image reading apparatus according to claim 5, wherein
   the opening portion is provided on one end side of the joint in a direction intersecting the transport direction, and
   the control unit determines front and back sides of the carrier sheet by detecting a position of the opening portion from the reading result from the reading unit reading the opening portion.

7. An image reading apparatus configured to read an image on an original document that is sandwiched by a carrier sheet including a joint where peripheral portions of two sheets for sandwiching the original document are joined, the image reading apparatus comprising:
   a transport unit configured to transport the carrier sheet;
   a reading unit configured to read the image on the original document sandwiched by the carrier sheet transported;
   a carrier sheet detecting unit located upstream of the reading unit in a transport direction, and configured to detect the carrier sheet transported;
   a multi-feeding detecting unit configured to detect multi-feeding of an original document transported by the transport unit; and
   a control unit configured to determine that the carrier sheet is transported based on a detection result of the carrier sheet detecting unit or a reading result of the reading unit, wherein
   the control unit is configured to switch between adopting the detection result of the carrier sheet detecting unit and adopting the reading result of the reading unit,
   the control unit determines multi-feeding of the original document based on a detection result of the multi-feeding detecting unit when the control unit determines that the carrier sheet is transported based on the detection result of the carrier sheet detecting unit,
   the control unit determines multi-feeding of the original document based on the reading result of the reading unit when the control unit determines that the carrier sheet is transported based on the reading result of the reading unit,
   the control unit reports an error, when the control unit determines that multi-feeding of the original document occurs, and
   the control unit does not determine multi-feeding of the original document, when the control unit determines that the carrier sheet is transported, and
   a first period is shorter than a second period, where
   the first period is a period in which the original document is transported, multi-feeding of the original document is determined, and the error is reported, when the control unit determines that the carrier sheet is transported based on the detection result of the carrier sheet detecting unit, and
   the second period is a period in which the original document is transported, multi-feeding of the original document is determined, and the error is reported, when the control unit determines that the carrier sheet is transported based on the reading result of the reading unit.

8. An image reading method for reading an image by sandwiching an original document by a carrier sheet including a joint where peripheral portions of two sheets for sandwiching the original document are partially joined, comprising:
   a first step of detecting a transmissive identification hole formed at the joint by a carrier sheet detecting unit configured to detect the carrier sheet,
   a second step of detecting the transmissive identification hole based on an image read by an image reading unit, and
   a switching step of switching between adopting a detection result of the first step and adopting a reading result of the second step.

* * * * *